US007165067B1

(12) United States Patent
Suleiman

(10) Patent No.: US 7,165,067 B1
(45) Date of Patent: Jan. 16, 2007

(54) METHOD, SYSTEM, AND PROGRAM FOR CHARACTER SET MATCHING

(75) Inventor: Yaser Ib Suleiman, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 536 days.

(21) Appl. No.: 10/618,153

(22) Filed: Jul. 10, 2003

(51) Int. Cl.
*G06F 17/30* (2006.01)

(52) U.S. Cl. .......................................... 707/6; 707/203

(58) Field of Classification Search .............. 707/1–10, 707/100–104.1, 200–205
See application file for complete search history.

(56) References Cited

U.S. PATENT DOCUMENTS

| | | | | |
|---|---|---|---|---|
| 3,309,677 A | * | 3/1967 | Montgomery et al. | ...... 707/102 |
| 3,643,226 A | * | 2/1972 | Loizides et al. | ................ 707/3 |
| 3,670,310 A | * | 6/1972 | Bharwani et al. | ............... 707/3 |
| 3,702,010 A | * | 10/1972 | Schmidt et al. | ................. 707/3 |
| 4,358,824 A | * | 11/1982 | Glickman et al. | ............. 707/5 |
| 4,965,763 A | * | 10/1990 | Zamora | ......................... 704/1 |
| 5,412,807 A | * | 5/1995 | Moreland | ....................... 707/3 |
| 5,659,730 A | * | 8/1997 | Kelley et al. | ................... 707/3 |
| 5,745,899 A | * | 4/1998 | Burrows | ..................... 707/102 |
| 5,913,209 A | * | 6/1999 | Millett | ........................... 707/3 |
| 6,169,999 B1 | * | 1/2001 | Kanno | ......................... 715/532 |
| 6,584,458 B1 | * | 6/2003 | Millett et al. | ................... 707/3 |

* cited by examiner

*Primary Examiner*—Mohammad Ali
(74) *Attorney, Agent, or Firm*—Finnegan, Henderson, Farabow, Garrett & Dunner, L.L.P.

(57) ABSTRACT

Disclosed is a technique for matching character sets. One or more data set files are stored. One or more character set files are created, wherein each character set file is associated with a character set and includes indexes associated with the one or more data set files. A request specifying one or more character sets is received. One or more of the data set files that contain one or more of the requested character sets are identified using the indexes in the character set files.

24 Claims, 9 Drawing Sheets

Array of Index Entries 530

Array of Index Entries 540

METHOD, SYSTEM, AND PROGRAM FOR CHARACTER SET MATCHING

BACKGROUND OF THE INVENTION

1. Field of the Invention

The present invention is related to matching a character set against character sets in one or more data set files.

2. Description of the Related Art

Often times, individuals search through a large amount of data trying to find particular information. Many search engines enable an individual to enter one or more keywords that may be used to locate the desired information. The search engine, however, may take a long time in its attempt to match keywords to the large amount of data.

There are several situations in which it is highly desirable to obtain a quick result when a large population of data is to be searched to identify a match for a set of keywords. For example, consider the general case of an on-line purchasing process via, for example, a Web site on the Internet. The Internet is a world-wide collection of connected computer networks (i.e., a network of networks). The World Wide Web (also referred to as the "Web") is a system of Internet servers that support documents (e.g., Web pages). A Web site refers to a location on the Web at which one or more documents (e.g., one or more Web pages) are displayed. A buyer typically views a Web site of a company. The buyer has a set of criteria represented by keywords to be used to scan products for sale by the company on the Web site. A product with the maximum number of matches to the criteria is most likely to be the product that the buyer is looking for. For example, the buyer may search for a "blue sweater." A product that is identified as "blue" and as a "sweater" would be identified as the best match for the criteria.

Another example in which keywords may be used to locate particular information is in the hiring process. In this case, an employer may post job requirements, which includes a set of criteria represented by keywords (e.g., skill set, level of education, experience, etc.) that an applicant should possess in order to be able to fill the job requirements. The set of resumes for all applicants is scanned, looking for matches to the desired keywords in the job listing. Then, the employer may review the applicants who appear to be qualified for the job.

The problem of having to scan a large amount of data to select elements with properties that match a given set of keywords exists in many fields. However, existing search engines are oftentimes slow. Thus, there is a need for improved search techniques.

SUMMARY OF THE INVENTION

Provided are a method, system, and program for matching character sets. One or more data set files are stored. One or more character set files are created, wherein each character set file is associated with a character set and includes indexes associated with the one or more data set files. A request specifying one or more character sets is received. One or more of the data set files that contain one or more of the requested character sets are identified using the indexes in the character set files.

The described implementations of the invention provide a method, system, and program for providing both a technique for structuring data and a technique for character set matching that scans the data to provide a set of matches.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1:
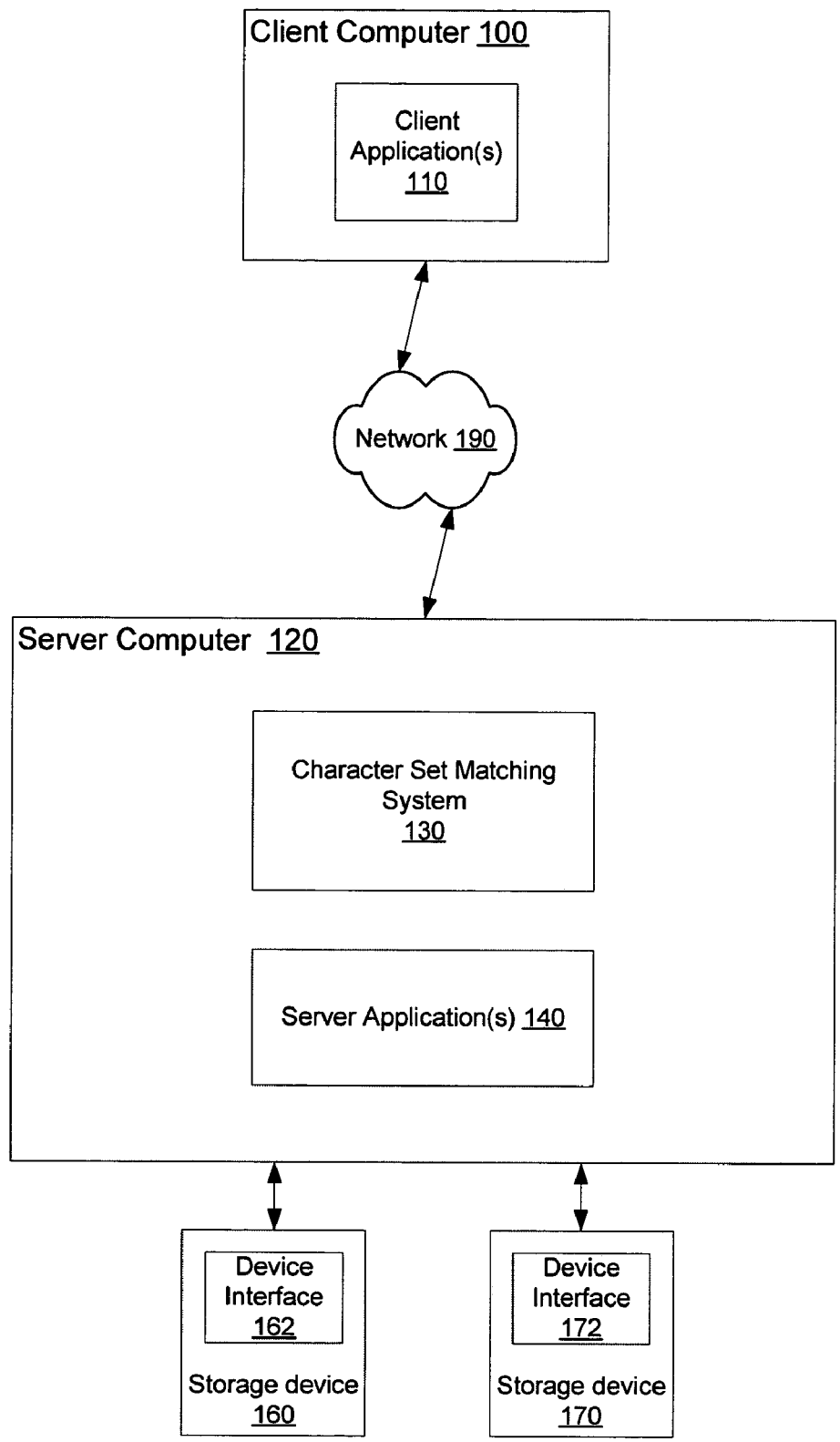
FIG. 1 illustrates, in a block diagram, a computing environment in accordance with certain implementations of the invention.

FIG. 1 illustrates, in a block diagram, a computing environment in accordance with certain implementations of the invention. A client computer 100 executes one or more client applications 110. A client application 110 may be any type of application program. The client computer 100 is connected to a server computer 120 by a network 190, such as a local area network (LAN), wide area network (WAN), or the Internet. The Internet is a world-wide collection of connected computer networks (i.e., a network of networks). The computer applications 110 may access data at the server computer 120.

The server computer 120 includes a character set matching system 130 and one or more server applications 140. The server applications 140 may be any type of applications. The character set matching system 130 receives a request to match a character set against a set of data set files located in one or more data set directories and identifies zero or more data set files that include the character set. Moreover, the server computer 120 is connected to storage devices 160, 170, and each storage device 160, 170 has a device interface 162, 172. For example, each storage device 160 and 170 may be a redundant array of independent disks (RAID). A RAID device enables storage of the same data on multiple hard disks, thus allowing simultaneous accesses to copies of the data.

Implementations of the invention structure data in a manner that enables improved character set matching. A character set comprises one or more characters, including, for example, alphabet letters, numbers, blank spaces, and symbols (e.g., *, #, &).

In terms of data organization, implementations of the invention construct data in the form of data set files (e.g., data files). Data set files may contain information in a "structured" or a "free form" format and include certain character sets (e.g., words) that are regarded as "keywords" that are of importance to a given application domain. The term "structured" format refers to data being organized in a particular manner. For example, a book is said to have a "structured" format since a book is organized in terms of certain rules, such as, chapters, paragraphs, indexes, etc. The term "free form" format refers to the fact that the data set files may be unstructured and need not contain data organized in any particular manner or according to any pre-defined rules.

Figure 2:
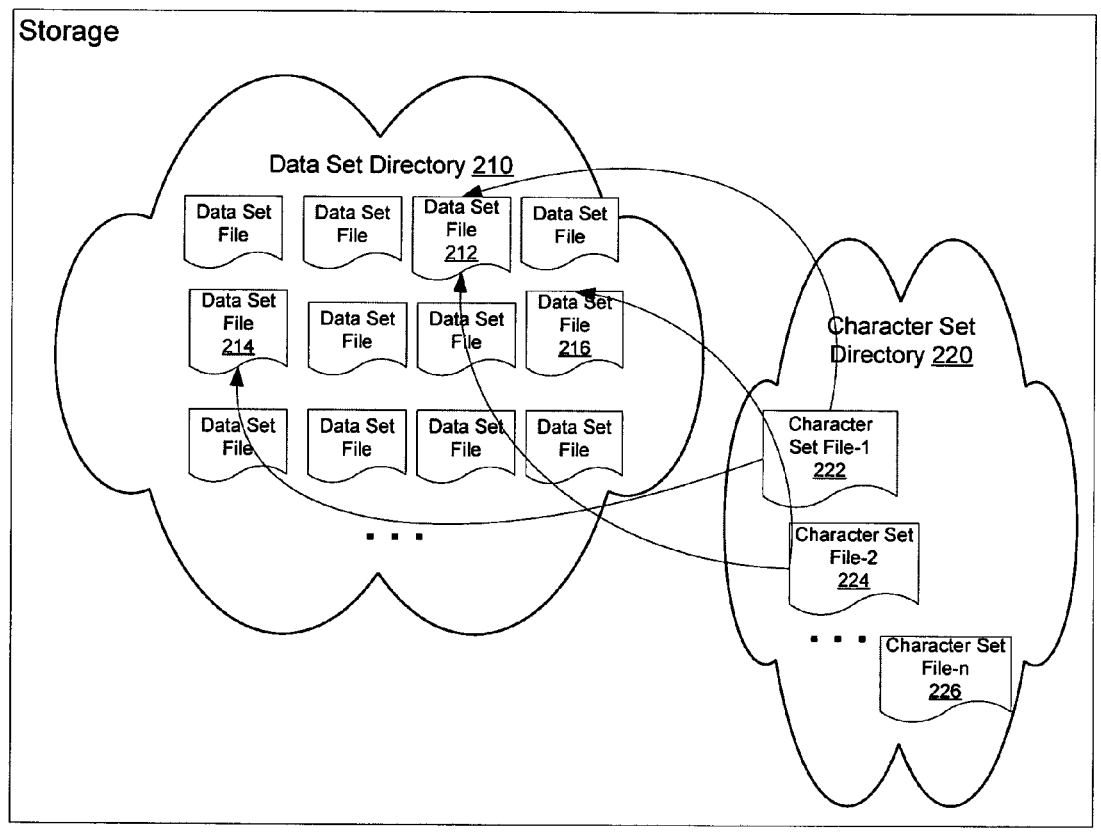
FIG. 2 illustrates, in a block diagram, data organization in accordance with certain implementations of the invention.

FIG. 2 illustrates, in a block diagram, data organization in accordance with certain implementations of the invention. In particular, FIG. 2 illustrates a data set directory 210, a character set directory 220, and relationships between data set files in the data set directory 210 and character set files in the character set directory 220. Each character set file (e.g., 222, 224, 226) contains one or more indexes (or pointers) to various data set files (in the data set) that contain one or more instances of the corresponding character set (i.e. keyword). Each data set file (e.g., 212, 214, 216) contains data to be matched to the character sets. The data set files contain structured or unstructured data (e.g., words). In certain implementations, the data belongs to a specific application domain of interest, e.g. resume files, job requirement files, product description files, etc.

Each data set file is identified in the system by a unique index assigned to the data set file when the data set file is created. The index may be any unique identifier that indicates the location of the data set file. In certain implementations, the indexes can be simply the absolute path name of the data set files or can be Extensible Markup Language (XML) pointers.

Character sets for which character set files are to be created may be identified by, for example, a system administrator or other individual. For each identified character set, implementations of the invention maintain an associated character set file. For example if the character sets: programming, user interfaces, object-oriented, and management are the desirable character sets, then four character set files are maintained, one file for each one of the character sets. Character set files contain indexes to individual data set files, which contain one or more instances of the character set associated with the character set file occurring one or more times. The indexes in a character set file are maintained in sorted order.

Whenever a new data set file is added to the data set directory 210, the new data set file is assigned an index and is scanned for character sets associated with the character set files in the character set directory 220. For each character set that appears one or more times in the data set file, the index of the data set file is inserted in sorted order in the associated character set file. For example, character set file-1 222 includes indexes to data set file 212 and data set file 214, and character set file-2 224 includes indexes to data set file 212 and data set file 216.

Figure 3:
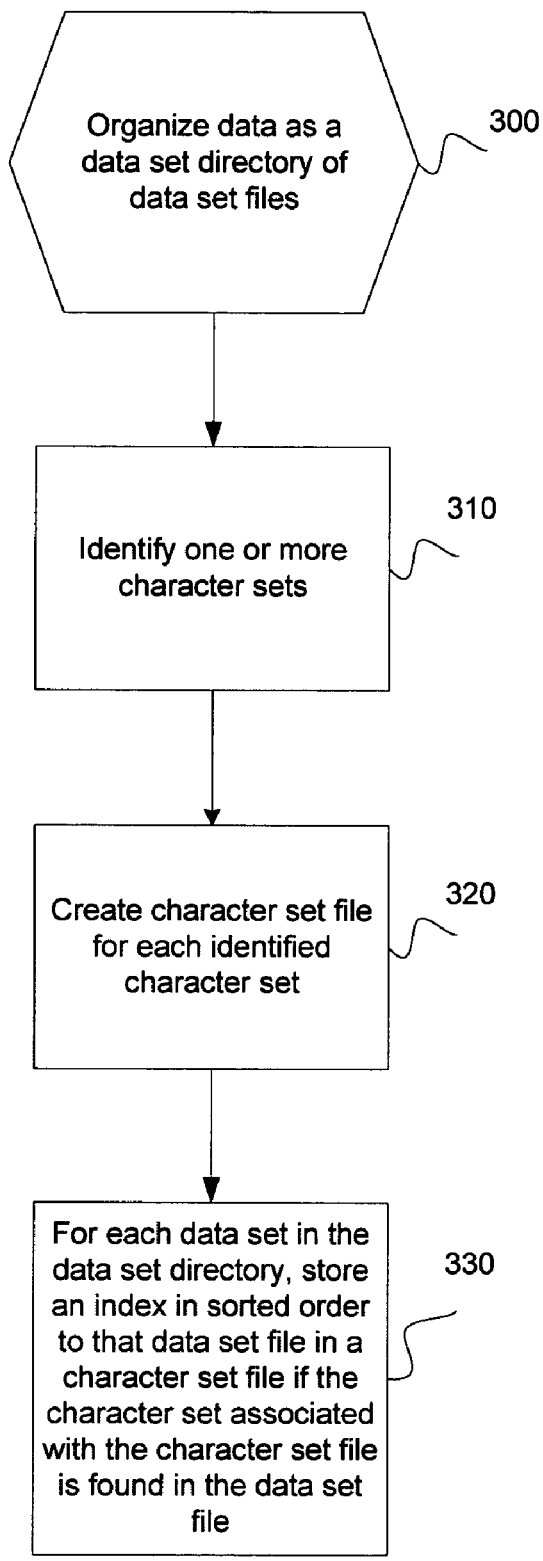
FIG. 3 illustrates logic implemented in accordance with certain implementations of the invention.

FIG. 3 illustrates logic implemented in accordance with certain implementations of the invention. Control begins at block 300 with data being organized, for example, by a system administrator or other individual, as a data set directory of data set files. In block 310, character sets are identified, by, for example, a system administrator or other individual. In certain implementations of the invention, the character sets may be identified with computer software or hardware that is implemented to consider various factors. For example, data set files may be structured in accordance with certain rules, such as those of XML, in which case character sets are constructed in accordance with specific rules and formats, which enables a computer program to parse data set files and automatically identify desired character sets. In block 320, a character set file is created for each identified character set. In block 330, for each data set in the data set directory, an index to that data set file is stored in a character set file if the character set associated with the character set file is found in the data set file.

Figure 4A:
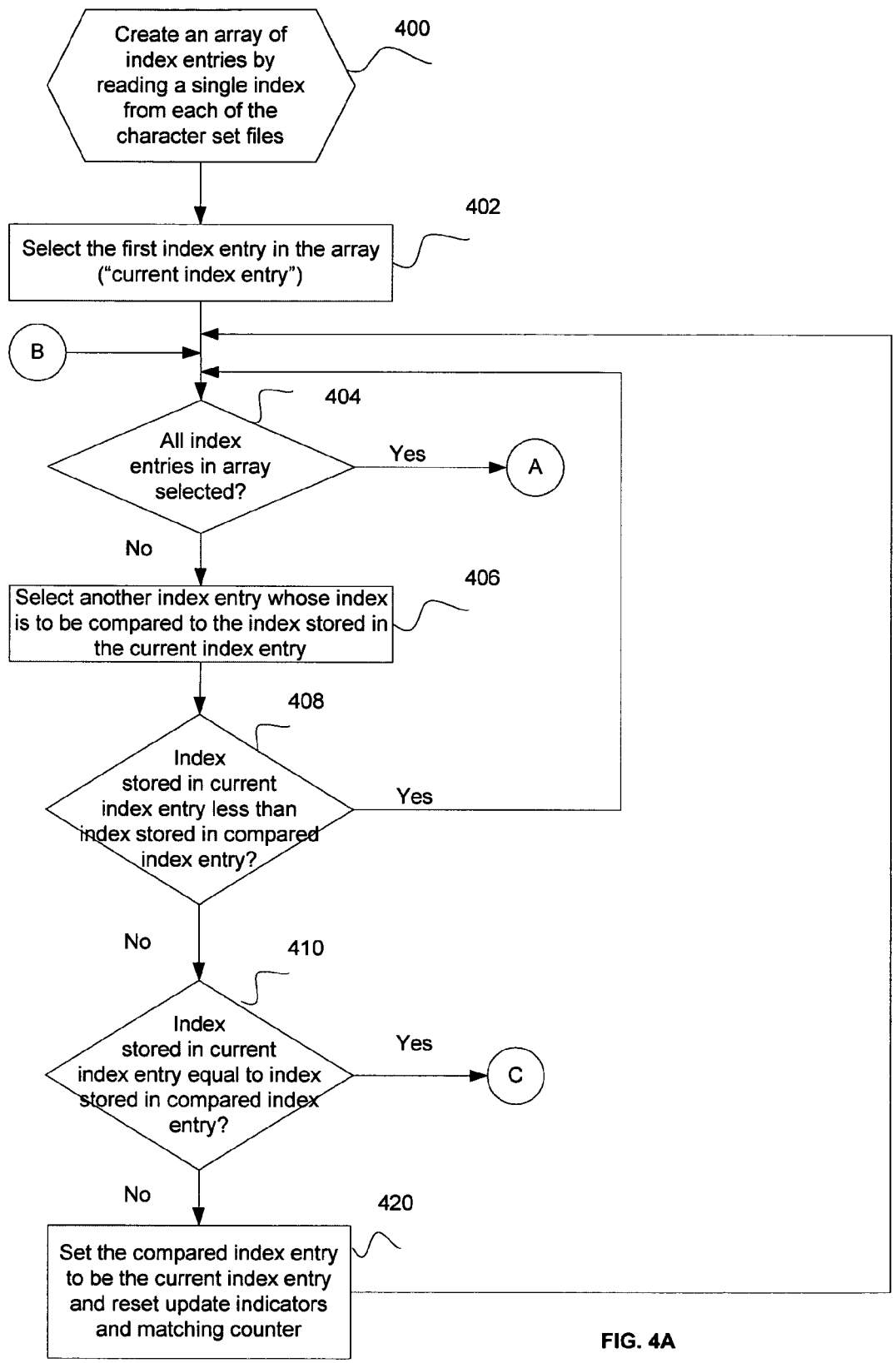
FIGS. 4A, 4B, and 4C illustrate logic implemented in the character set matching system in accordance with certain implementations of the invention.
Figure 4B:
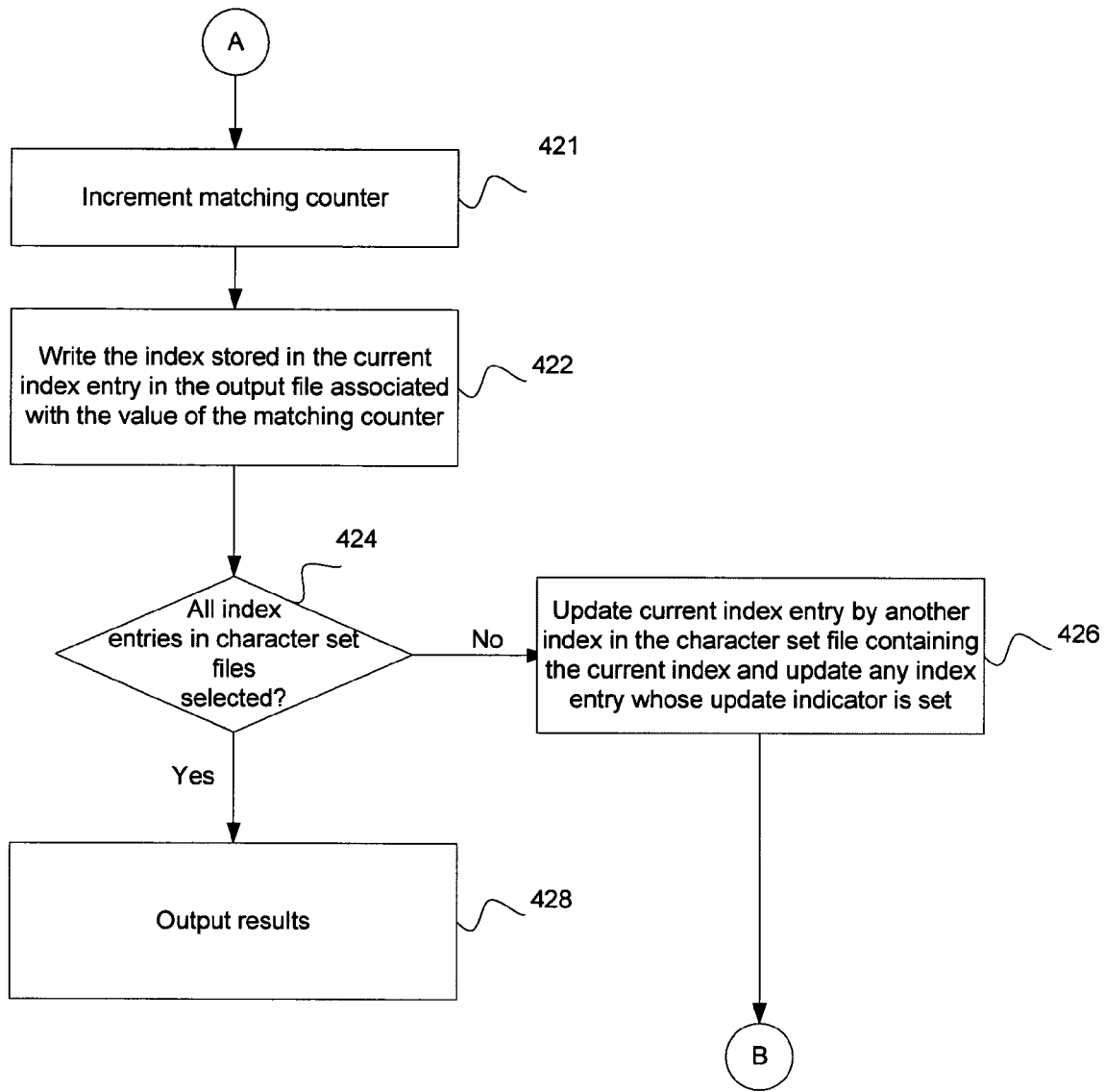
Figure 4C:
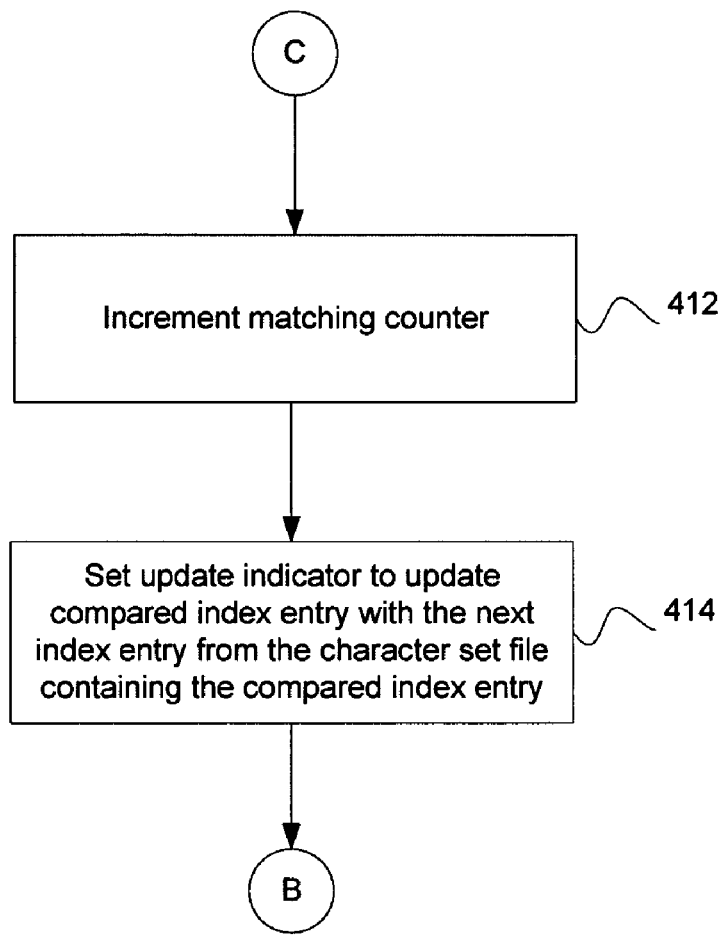

FIGS. 4A, 4B, and 4C illustrate logic implemented in the character set matching system 130 in accordance with certain implementations of the invention. Control begins at block 400 with the character set matching system 130 creating an array of index entries by reading a single index from each of the character set files. In block 402, the character set matching system 130 selects the first index entry in the array. The selected index entry is also referred to as a "current index entry."

In block 404, the character set matching system 130 determines whether all index entries in the array have been selected. If so, processing continues to block 421 (FIG. 4B), otherwise, processing continues to block 406. In block 406, the character set matching system 130 selects another index entry whose index is to be compared with the index stored in the current index entry, and this other index entry is referred to as a "compared index entry."

In certain implementations of the invention, the indexes are stored in character set files in non-numeric format (e.g., as XML paths) and are converted to a numeric format for comparison. In certain alternative implementations of the invention, the indexes are stored in the character set files in a numeric format in ascending order (e.g., 1, 2, 3, . . . ). In block 408, the character set matching system 130 determines whether the index stored in the current index entry is less than the index stored in the compared index entry. That is, the character set matching system 130 compares the index stored in the current index entry to each index stored in each other index entry, one by one. If the index stored in the current index entry is less than the index stored in the compared index entry, processing loops back to block 406, otherwise, processing continues to block 410.

In block 410, the character set matching system 130 determines whether the index stored in the current index entry is equal to the index stored in the compared index entry. If so, processing continues to block 412, otherwise, processing continues to block 420. In block 412, the character set matching system 130 increments a matching counter. In block 414, the character set matching system 130 sets an update indicator (e.g., a flag) to update the index stored in the compared index entry with the next index from the character set file corresponding to the compared index entry. For example, if a character set file has index-1 and index-2 and the compared index entry stores index-1, then an update indicator is set to update the compared index entry with index-2 for another iteration of processing. Note that the update occurs in block 426. After the processing of block 414, processing loops back to block 404.

In block 420, the character set matching system 130 sets the compared index entry to be the current index entry and resets update indicators and the matching counter. The update indicators would have been set for index entries of a particular value that is greater than the compared index entry, but, if the current index entry is changed to the compared index entry, then the update indicators are reset so that the index entries are not updated.

When the index stored in the current index entry is greater than the index stored in the compared index entry, then the compared index entry becomes the current index entry and processing continues by comparing the index stored in the new current index entry with the indexes stored in the remaining index entries. If a character set file has no more indexes, then the index entry in the array 500 corresponding to the character set file is set to, for example, NULL or some other value, to indicate that there are no more indexes in the character set file, and, hence will be skipped during the following iterations of comparisons. Additionally, in certain implementations of the invention, selection of an index entry selects a non-NULL index entry.

In block 421, the character set matching system 130 increments the matching counter. In block 422, the character set matching system 130 writes the index stored in the current index entry in the output file associated with the value of the matching counter. That is, each matching counter value has an associated output file for storing matching index entries. The number of output files is equal to the number of given character sets, and, in certain implementations of the invention, the output files may be identified as: outputfile1, outputfile2, . . . , outputfilek, where k=number of given character sets. For example, outputfile1 contains indexes for data set files that include one of the given character sets, and outputfile2 contains indexes for data set files that include two of the given character sets, and so on.

In block 424, the character set matching system 130 determines whether all index entries in the character set files have been selected. If so, processing loops to block 428, otherwise, processing loops back to block 426. In block 426, the character set matching system 130 updates the current index entry by another index from the character set file corresponding to the current index entry and containing the current index and updates any index entry whose update indicator is set to indicate that the index entry is to be updated, and loops back to block 404.

In block 428, the results are output. The results include outputfilek with all indexes to data set files in the data set directory that match all k character sets, followed by outputfilek−1 with matches to k−1 character sets, outputfilek−2, . . . , outputfile2, outputfile1.

FIGS. 5A, 5B, 5C, 5D, 5E, and 5F illustrate arrays of index entries and output files used in describing an example in accordance with certain implementations of the invention. Each index entry stores an index from a corresponding character set file. Each output file stores zero or more indexes. For this example, there are four character set files. Each character set file has a column of indexes that are represented by numbers and which are ordered in ascending order. In particular, a first character set file includes indexes: 5, 10. A second character set file includes indexes: 3, 10. A third character set file includes index: 20. A fourth character set file includes indexes: 2, 5, 10. Although the example described herein is very simple to assist with understanding of implementations of the invention, implementations of the invention may work with many more character set files containing many more indexes.

Figure 5A:
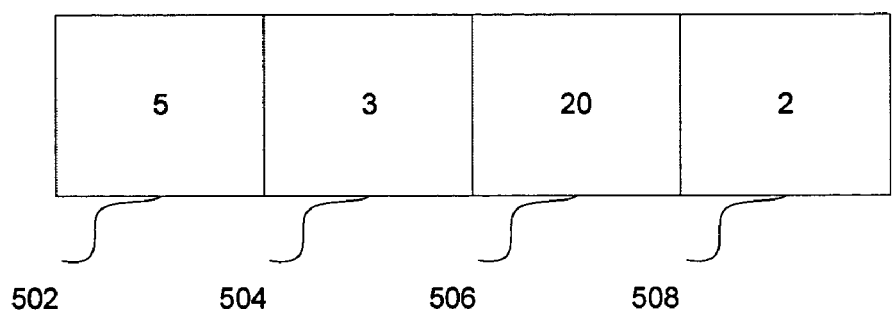
FIGS. 5A, 5B, 5C, 5D, 5E, and 5F illustrate arrays of index entries and output files used in describing an example in accordance with certain implementations of the invention.

Initially, an index from each of the four character set files is selected and stored in a corresponding index entry in an array of index entries 500 (FIG. 5A). Index entry 502 contains five, index entry 504 contains three, index entry 506 contains twenty, and index entry 508 contains two. The first ("current") index entry 502 of five is compared to the next index entry 504 of three. Since the current index entry 502 of five is greater than the compared index entry 504 of three, the processing in block 420 occurs. That is, the current index entry is set to index entry 504 of three and any update indicators are reset. In this example, there are no update indicators set at this time.

The next index entry 506 of twenty is selected. Since the current index entry 504 of three is less than the compared index entry 506 of twenty, the next index entry 508 of two is selected for comparison. Since the current index entry 504 of three is greater than the compared index entry 508 of two, the compared index entry 508 of two becomes the current index entry.

Since all index entries in the array 500 have been selected, a matching counter for two is incremented to indicate that there is one match, and the index of two is stored in outputfile1 552, which stores the indexes whose matching counter is one.

Figure 5B:
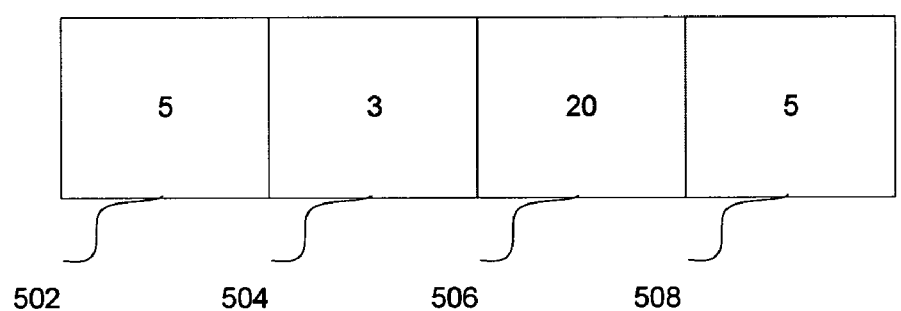

Also, since there are additional index entries in the fourth character set file of this example, index entry 508 is updated with another index entry in the character set file that contains index entry 508. In this example, FIG. 5B illustrates an array of index entries 510 in which index entry 508 has been updated to contain five.

For the next iteration, index entry 502 is the current index entry. Since the current index entry 502 of five is greater than index entry 504 of three, index entry 504 becomes the current index entry. Since the index entry 504 of three is less than index entry 506 of twenty and index entry 508 of five, and all index entries in the array 510 have been selected (block 404), processing continues to block 421. The index of three is stored in outputfile1 552.

Figure 5C:
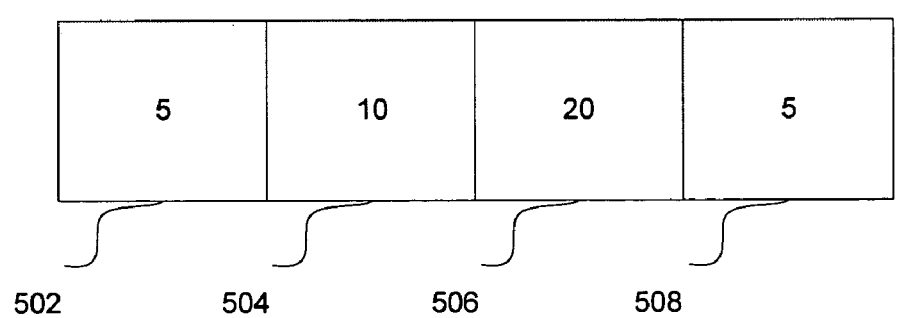

FIG. 5C illustrates an array of index entries 520 in which index entry 504 is updated to ten. For the next iteration, the current index entry is index entry 502 of five. In this iteration, index entry 502 of five is found to match index entry 508 of five (in block 410). Therefore, the matching counter is incremented to one, indicating there is one match for index entry 502 of five. An update indicator is set for index entry 508 of five. Then processing loops back to block 404. Since all index entries in the array 520 have been selected, processing continues to block 421. The matching counter is incremented to two, and the index of five is stored in outputfile2 554, which contains index entries with two matches. Then, the current index entry 502 of five and the index entry 508, whose update indicator is set, are updated.

Figure 5D:
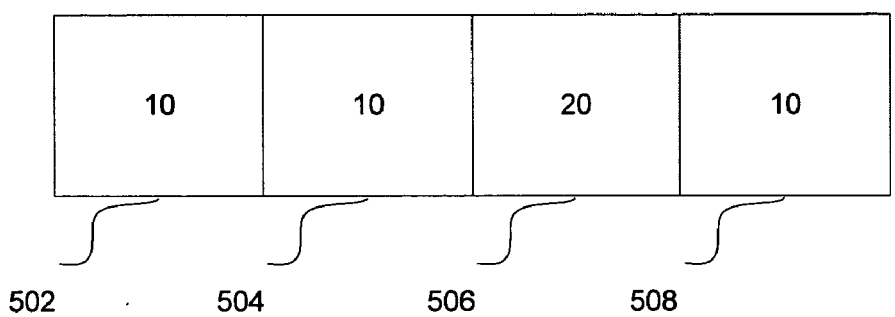

FIG. 5D illustrates an array of index entries 530 in which index entry 502 and index entry 508 have been updated to ten. In this iteration, it is determined that there are three matches for index entry of ten, and the index of ten is stored in outputfile3 556.

Figure 5E:
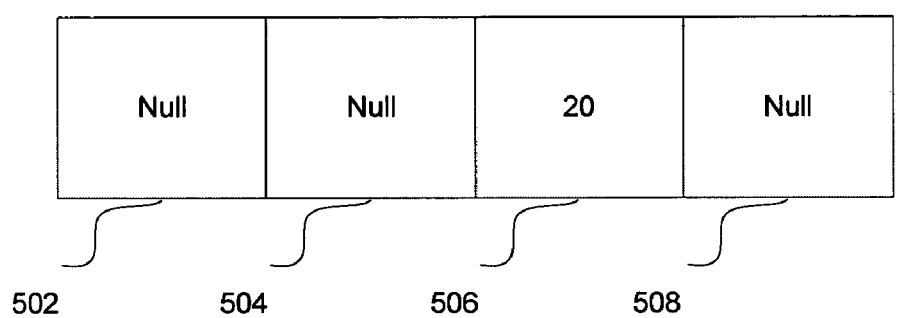

FIG. 5E illustrates an array of index entries 540 in which index entry 502, index entry 504, and index entry 508 have been updated to NULL to indicate that there are no more index entries in the character set files associated with these index entries in the array. Then, the index of twenty is stored in outputfile1 552.

Figure 5F:
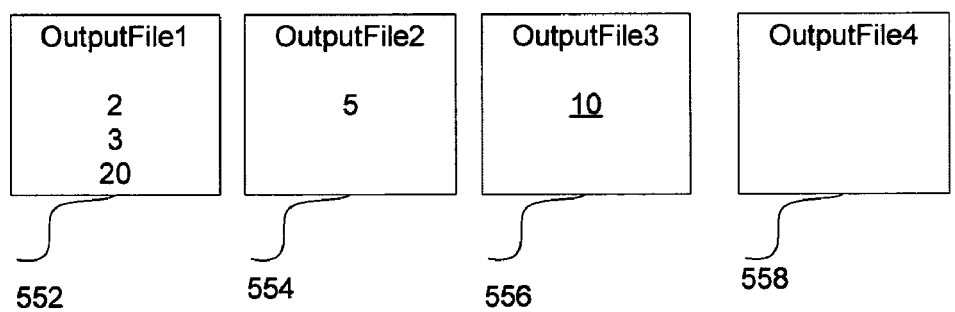

FIG. 5F illustrates outputfile1 552, outputfile2 554, outputfile3 556, and outputfile4 558, which would be output at block 428.

Table A lists pseudocode written in the JAVA™ programming language that represents processing performed by the matching technique in accordance with certain implementations of the invention.

TABLE A

```
import java.io.*;
public class Match {
 public static void main(String args[ ]) {
  int nTokens = args.length;
  String href [ ] = new String[nTokens];
  boolean hrefUpdate [ ] = new boolean[nTokens];
  TokenFile tf [ ] = new TokenFile[nTokens];
  OutFile of [ ] = new OutFile[nTokens];
  boolean more_to_compare = false;
  String baseDIR = "<base directory of keyword files>";
  String current_value = null;
```

TABLE A-continued

```
String tmp_value = null;
int hrefPtr = 0;
int count = 0;
int i;
// initialize the token & output files & fill up the href array.
for (i=0; i<nTokens; i++) {
try {
tf[i] = new TokenFile(baseDIR + args[i]);
href[i] = tf[i].readLine( );
hrefUpdate[i] = false;
of[i] = null;
} catch (IOException e) {
System.out.println("couldn't read token file");
}
}
do {
hrefPtr = 0;
count = 0;
i = 0;
current_value = null;
for (i=0; i<nTokens; i++) {
if (current_value == null) {
if (href[i] != null) {
current_value = href[i];
hrefUpdate[i] = true;
count = 0;
tmp_value = null;
continue;
}
else
continue;
}
// at this point current_value is not null.
// if tmp_value is null then skip this iteration.
tmp_value = href[i];
if (tmp_value == null)
continue;
int cmp = current_value.compareTo(tmp_value);
if(cmp < 0) {
continue;
}
else if (cmp == 0) {
count++;
hrefUpdate[i] = true;
}
else {// i.e. last case: current_value > tmp_value.
// clear hrefUpdate array
for (int j=0; j<nTokens; j++)
hrefUpdate[j] = false;
current_value = tmp_value;
hrefUpdate[i] = true;
count = 0;
}
} // end of for.
// if we got current_value != null, then need to output it
// into one of the output file according to its count.
// need also to update the cells of hrefUpdate by reading
// a new line from the token file
if (current_value != null) {
String ofile = String.valueOf(count + 1);
// check if this is the first time we create
// OutFile object for this file.
if (of[count] == null)
of[count] = new OutFile(ofile);
// write down current_value in the output file
try {
of[count].writeLine(current_value);
} catch (IOException e) {
System.out.println("couldn't write to output file");
}
// update "current_value"(s) with new ones from their
// token file.
for (int j=0; j<nTokens; j++) {
if (hrefUpdate[j] == true) {
try {
href[j] = tf[j].readLine( );
hrefUpdate[j] = false;
} catch (IOException e) {
System.out.println("couldn't write to output file");
```

TABLE A-continued

```
}
}
}
} //end of if
} while (current_value != null);
}
}
```

The matching technique sweeps through each of the character set files only once in a concurrent fashion to read index entries. Each index entry value is then compared to other index entry values. The possible number of comparison operations for each index value ranges from zero up to k−1 operations. A worst case scenario may occur if each character set file contain an exclusive set of indexes. To calculate complexity, assume n to be the total number of all indexes in all character set files, and that each file has the same number of indexes (i.e. n/k indexes, where k is the number of the given character sets). Therefore:

$$O(n) = (k-1)(n/k) + (k-2)(n/k) + \ldots + (2)(n/k) + (n/k)$$
$$= (k(k-1))/2 * (n/k)$$
$$= (k-1)/2 * n$$

Although the above formula represents a worst case scenario, in typical applications, k is really much less than n, which makes the complexity close to linear.

The matching technique produces a set of output files that include the indexes to data set files with matches to the given set of character sets. For example, in the case of searching for candidates with skill sets that match a given job listing, a search may be performed for candidates with four skills (e.g., programming, user interfaces, object-oriented, and management). The matching technique finds the data set files (e.g., resume files) with matches to one or more of the four character sets.

The described techniques for character set matching may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 3 and 4A–4C describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The illustrated logic of FIGS. 3 and 4A–4C was described as being implemented in software. The logic may be implemented in hardware or in programmable and non-programmable gate array logic.

Figure 6:
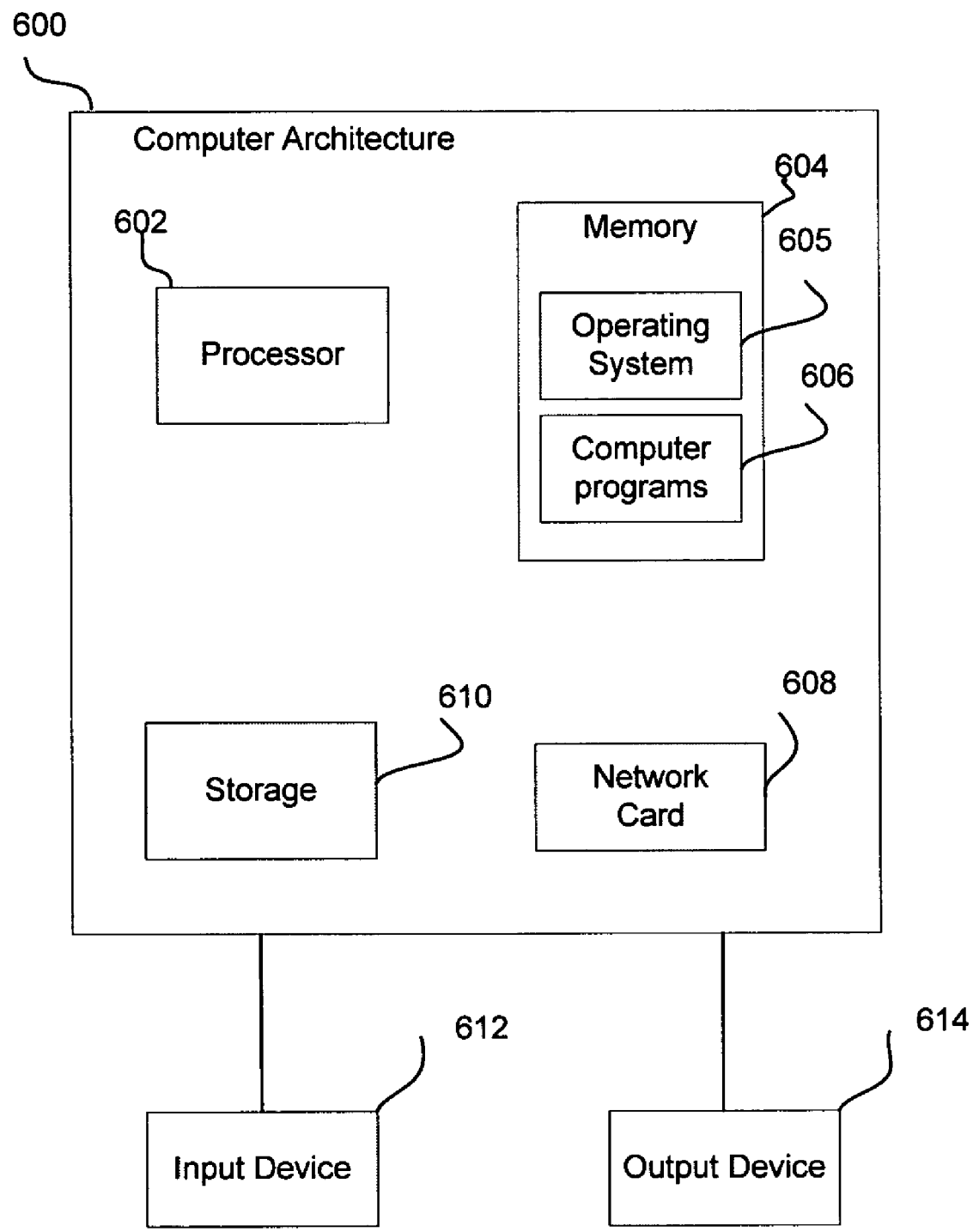
FIG. 6 illustrates an architecture of a computer system that may be used in accordance with certain implementations of the invention.

FIG. 6 illustrates an architecture of a computer system 100, 120 that may be used in accordance with certain implementations of the invention. The computer architecture 600 may implement a processor 602 (e.g., a microprocessor), a memory 604 (e.g., a volatile memory device), and storage 610 (e.g., a non-volatile storage area, such as magnetic disk drives, optical disk drives, a tape drive, etc.). An operating system 605 may execute in memory 604. The storage 610 may comprise an internal storage device or an attached or network accessible storage. Computer programs 606 in storage 610 may be loaded into the memory 604 and executed by the processor 602 in a manner known in the art. The architecture further includes a network card 608 to enable communication with a network. An input device 612 is used to provide user input to the processor 602, and may include a keyboard, mouse, pen-stylus, microphone, touch sensitive display screen, or any other activation or input mechanism known in the art. An output device 614 is capable of rendering information transmitted from the processor 602, or other component, such as a display monitor, printer, storage, etc. The computer architecture 600 of the computer systems may include fewer components than illustrated, additional components not illustrated herein, or some combination of the components illustrated and additional components.

The computer architecture 600 may comprise any computing device known in the art, such as a mainframe, server, personal computer, workstation, laptop, handheld computer, telephony device, network appliance, virtualization device, storage controller, etc. Any processor 602 and operating system 605 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

JAVA is a registered trademark or trademark of Sun Microsystems, Inc. in the United States and/or other countries.

What is claimed is:

1. A method for matching character sets, comprising:
   storing one or more data set files;
   creating one or more character set files, wherein each character set file is associated with a character set and includes indexes associated with the one or more data set files;
   creating a set of index entries, wherein each index entry in the set corresponds to a character set file and stores an index that is also stored in the corresponding character set file;
   comparing the indexes stored in the index entries included in the set of index entries to determine whether any of the index entries match another index entry in the set of index entries;
   updating at least one output file based on the comparing, the at least one output file being configured to store zero or more indexes based on a number of matches between the compared index entries;
   receiving a request specifying one or more character sets; and
   identifying one or more of the data set files that contain one or more of the requested character sets using the indexes in the character set files.

2. The method of claim 1, wherein creating a set of index entries includes creating an array of index entries, wherein each index entry in the array corresponds to a character set file and stores an index stored in the corresponding character set file; and
   wherein comparing the index entries includes comparing a current index entry to a compared index entry.

3. The method of claim 2, further comprising:
   if the current index entry includes an index having a value that is less than an index included in the compared index entry, selecting another index entry for comparison.

4. The method of claim 2, further comprising:
   if the current index entry includes an index having a value that is greater than an index included in the compared index entry, replacing the current index entry with the compared index entry; and
   resetting zero or more update indicators.

5. The method of claim 2, further comprising:
   if the current index entry includes an index having a value that is equal to an index included in the compared index entry, incrementing a matching counter; and
   setting an update indicator for the compared index entry.

6. The method of claim 2, further comprising:
   if all of the index entries in the array have been selected for comparison, incrementing a matching counter; and
   storing the index in the current index entry in the at least one output file, the at least one output file being associated with a value of a matching counter associated with the index.

7. The method of claim 6, further comprising:
   if all of the indexes in the character set files have not been selected for comparison, updating the current index entry; and
   updating any index entry having an update indicator set.

8. The method of claim 7, further comprising:
   if all of the indexes in the character set files have been selected, outputting a number of output files that is equivalent to the number of character set files, wherein each output file stores zero or more indexes.

9. An article of manufacture including instructions for performing, when executed by a processor, operations for matching character sets, wherein the article of manufacture includes a memory device or hardware logic and the operations comprise:
   storing one or more data set files;
   creating one or more character set files, wherein each character set file is associated with a character set and includes indexes associated with the one or more data set files;

creating a set of index entries, wherein each index entry in the array corresponds to a character set file and stores an index that is also stored in the corresponding character set file;

comparing the indexes stored in the index entries included in the set of index entries to determine whether any of the index entries match another index entry in the set of index entries;

updating at least one output file based on the comparing, the at least one output file being configured to store zero or more indexes based on a number of matches between the compared index entries;

receiving a request specifying one or more character sets; and identifying one or more of the data set files that contain one or more of the requested character sets using the indexes in the character set files.

10. The article of manufacture of claim 9, wherein the operations further comprise:

creating an array of index entries, wherein each index entry in the array corresponds to a character set file and stores an index stored in the corresponding character set file; and wherein comparing the index entries includes comparing a current index entry to a compared index entry.

11. The article of manufacture of claim 10, wherein the operations further comprise:

if the current index entry includes an index having a value that is less than an index included in the compared index entry, selecting another index entry for comparison.

12. The article of manufacture of claim 10, wherein the operations further comprise:

if the current index entry includes an index having a value that is greater than an index included in the compared index entry, replacing the current index entry with the compared index entry; and resetting zero or more update indicators.

13. The article of manufacture of claim 10, wherein the operations further comprise:

if the current index entry includes an index having a value that is equal to an index included in the compared index entry, incrementing a matching counter; and setting an update indicator for the compared index entry.

14. The article of manufacture of claim 10, wherein the operations further comprise:

if all of the index entries in the array have been selected for comparison, incrementing a matching counter; and storing the index in the current index entry in the at least one output file, the at least one output file being associated with a value of a matching counter associated with the index.

15. The article of manufacture of claim 14, wherein the operations further comprise:

if all of the indexes in the character set files have not been selected for comparison, updating the current index entry; and updating any index entry having an update indicator set.

16. The article of manufacture of claim 15, wherein the operations further comprise:

if all of the indexes in the character set files have been selected, outputting a number of output files that is equivalent to the number of character set files, wherein each output file stores zero or more indexes.

17. A system for matching character sets, comprising:

means for storing one or more data set files;

means for creating one or more character set files, wherein each character set file is associated with a character set and includes indexes associated with the one or more data set files;

means for creating a set of index entries, wherein each index entry in the array corresponds to a character set file and stores an index that is also stored in the corresponding character set file;

means for comparing the indexes stored in the index entries included in the set of index entries to determine whether any of the index entries match another index entry in the set of index entries;

means for updating at least one output file based on the comparing, the at least one output file being configured to store zero or more indexes based on a number of matches between the compared index entries;

means for receiving a request specifying one or more character sets; and means for identifying one or more of the data set files that contain one or more of the requested character sets using the indexes in the character set files.

18. The system of claim 17, wherein the means for creating a set of index entries includes means for creating an array of index entries, wherein each index entry in the array corresponds to a character set file and stores an index stored in the corresponding character set file, and wherein the means for comparing the index entries includes means for comparing a current index entry to a compared index entry.

19. The system of claim 18, further comprising:

means for, if the current index entry includes an index having a value that is less than an index included in the compared index entry, selecting another index entry for comparison.

20. The system of claim 18, further comprising:

means for, if the current index entry includes an index having a value that is greater than an index included in the compared index entry,
  (i) replacing the current index entry with the compared index entry; and
  (ii) resetting zero or more update indicators.

21. The system of claim 18, further comprising:

means for, if the current index entry includes an index having a value that is equal to an index included in the compared index entry,
  (i) incrementing a matching counter; and
  (ii) setting an update indicator for the compared index entry.

22. The system of claim 18, further comprising:

means for, if all of the index entries in the array have been selected for comparison,
  (i) incrementing a matching counter; and
  (ii) storing the index in the current index entry in the at least one output file, the at least one output file being associated with a value of a matching counter associated with the index.

23. The system of claim 22, further comprising:

means for, if all of the indexes in the character set files have not been selected for comparison,
  (i) updating the current index entry; and
  (ii) updating any index entry having an update indicator set.

24. The system of claim 23, further comprising:

means for, if all of the indexes in the character set files have been selected, outputting a number of output files that is equivalent to the number of character set files, wherein each output file stores zero or more indexes.

* * * * *